(12) United States Patent
Kondo (10) Patent No.: US 6,322,452 B1
(45) Date of Patent: Nov. 27, 2001

(54) POWER TRANSMISSION SHAFT UNIT

(75) Inventor: Shinichi Kondo, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/615,746

(22) Filed: Jul. 13, 2000

(30) Foreign Application Priority Data

Aug. 31, 1999 (JP) .................................................. 11-246284

(51) Int. Cl.$^7$ .................................................... F16D 3/22
(52) U.S. Cl. ................................................ 464/17; 403/32
(58) Field of Search ........................... 464/17, 178, 179; 285/14, 41; 403/32

(56) References Cited

U.S. PATENT DOCUMENTS

| | | | |
|---|---|---|---|
| 2,432,803 | * 12/1947 | Rice | .................................... 464/17 X |
| 4,887,917 | * 12/1989 | Troster et al. | ................... 464/178 X |
| 5,429,552 | * 7/1995 | Scherner et al. | ........................ 464/17 |
| 5,853,250 | * 12/1998 | Krude et al. | ..................... 464/178 X |

OTHER PUBLICATIONS

Service Manual of Mitsubishi Pajero, Mitsubishi Motor Co., Jul. 1993.

* cited by examiner

Primary Examiner—Lynne H. Browne
Assistant Examiner—Greg Binda
(74) Attorney, Agent, or Firm—Foley & Lardner (57) ABSTRACT

A power transmission shaft unit, such as propeller shaft unit, drive shaft unit or the like comprises a universal coupling having a first contact surface; a hollow connecting member having a second contact surface; and a coupling structure that connects the first and second contact surfaces in a manner to constitute an enclosed space that includes an interior of the universal coupling and that of the connecting member. An air passage is provided which extends between the enclosed space and an open air. The air passage is bent in shape.

10 Claims, 9 Drawing Sheets

POWER TRANSMISSION SHAFT UNIT

BACKGROUND OF THE INVENTION

1. Field of the Invention

The present invention relates in general to a power transmission shaft unit for use in wheeled motor vehicles, and more particularly to a power transmission shaft unit such as propeller shaft unit, drive shaft unit or the like of the vehicle.

2. Description of the Prior Art

Some of the power transmission shaft units are of a type that comprises a universal coupling and a hollow connecting member which are connected in line. These two members have mating surfaces at their axial connecting ends. One of the mating surfaces is formed with an annular ridge that is coupled with an annular recess formed in the other of the mating surfaces, and the universal coupling and the hollow connecting member are joined with the aid of connecting bolts.

However, sometimes, the above-mentioned joining tends to cause the two joined members to constitute therebetween an isolated air space. Thus, under operation of the transmission shaft unit, heat inevitably produced in the universal coupling transmits to the isolated air space to heat and thus expand the air therein. However, the expansion of air tends to apply a marked stress to sealing members, such as a dust boot and the like, causing the sealing members to have an undesired permanent set. One of measures for solving this undesirable matter is to provide the isolated air space with an air discharge passage. This measure is described in Service Manual of MITSUBISHI PAJERO issued from MITSUBISHI MOTOR CO., in July, 1993.

However, even this measure has failed to provide a satisfied performance due to its inherent construction. That is, in this known measure, foreign matters, such as muddy water and the like tend to enter the enclosed space through the air discharge passage, which has an undesired influence on lubrication of friction parts in the shaft unit.

SUMMARY OF THE INVENTION

Accordingly, it is an object of the present invention to provide a power transmission shaft unit which is free of the above-mentioned drawback and superior to the above-mentioned known power transmission shaft unit.

According to a first aspect of the present invention, there is provided a power transmission shaft unit which comprises a universal coupling having a first contact surface; a hollow connecting member having a second contact surface; a coupling structure that connects the first and second contact surfaces in a manner to constitute an enclosed space that includes an interior of the universal coupling and that of the connecting member; and an air passage that extends between the enclosed space and an open air, the air passage being bent in shape.

According to a second aspect of the present invention, there is provided a power transmission shaft unit which comprises a universal coupling having a first contract surface, the universal coupling including spherical outer and inner rings, a plurality of balls, a spherical cage for rotatably holding the balls between the outer and inner rings, a stub shaft having a splined end engaged with a splined bore formed in the inner ring and a dust boot extending between the dust boot and the stub shaft, the first contact surface being defined by an annular flange provided by the outer ring; a hollow connecting member having at a diametrically enlarged end thereof a second contact surface; a coupling structure that connects the first and second contact surfaces in a manner to constitute an enclosed space that includes an interior of the universal coupling and that of the hollow connecting member; a dust cap disposed in the enclosed space to divide the same into first and second space portions, the first space portion being exposed to the interior of the coupling structure, the second space portion being exposed to the interior of the connecting member; an air breather provided by the dust cap, the air breather permitting an air flow from the first space portion to the second space portion; and an air passage that extends between the second space portion of the enclosed space and an open air, the air passage being bent in shape.

BRIEF DESCRIPTION OF THE DRAWINGS

Other objects and advantages of the present invention will become apparent from the following description when taken conjunction with the accompanying drawings, in which.

DETAILED DESCRIPTION OF THE EMBODIMENTS

Figure 1:
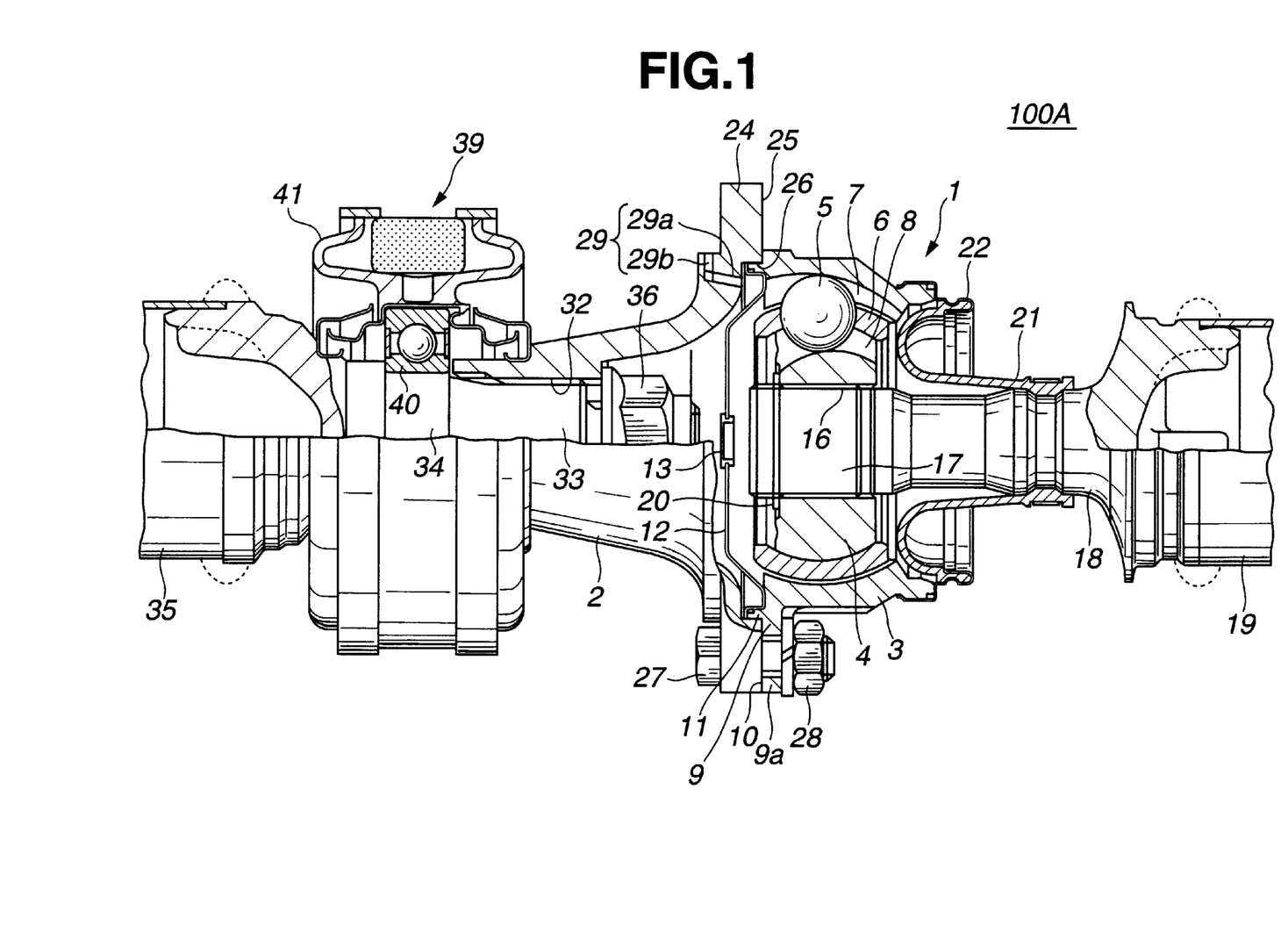
FIG. 1 is a sectional view of an essential portion of a power transmission shaft unit that is a first embodiment of the present invention.

Referring to FIG. 1, there is shown in a sectioned manner a power transmission shaft unit 100A, more specifically, a propeller shaft unit, which is a first embodiment of the present invention.

In the drawing, denoted by numeral 1 is a universal coupling and denoted by numeral 2 is a hollow connecting member that is connected to the universal coupling 1.

The universal coupling 1 comprises a spherical outer ring 3 that installs therein a spherical inner ring 4, a plurality of balls 5 and a spherical cage 6. The balls 5 are rotatably held in the cage 6. Each ball 5 has portions that are rotatably received in guide grooves 7 and 8 formed in the spherical outer and inner rings 3 and 4.

The outer ring 3 is formed at its axially inside end with an annular flange 9 that has a plurality of radially outwardly ear portions 9a. The relationship between the flange 9 and the ear portions 9a may be easily understood from FIG. 10.

Referring back to FIG. 1, the ear portions 9a of the flange 9 have flat contact surfaces 10 that are in contact with an annular contact surface 25 formed on a radially expanded end 24 of the connecting member 2. The radially expanded end 24 constitutes an annular flange. The axially inside end of the outer ring 3 is formed with an annular ridge 11 that projects from radially inside portions of the flat contact surfaces 10. A circular dust cap 12 is coupled with the annular ridge 11 to cover the interior of the universal coupling 1, as shown. The dust cap 12 is provided at its center portion with an air breather 13 which permits an air flow from the interior of the universal coupling 1 to the interior of the connecting member 2.

The spherical inner ring 4 is formed with a through bore 16 whose surrounding surface is formed with a plurality of parallel grooves, that is, splines. Coaxially engaged with the splined through bore 16 of the inner ring 4 is a splined shaft 17 that is integrally provided by a stub shaft 18. A snap ring 20 is used for suppressing disengagement of the splined shaft 17 from the bore 16 of the inner ring 4. The stub shaft 18 is connected through a tube 19 to a final drive gear (not shown).

Between the stub shaft 18 and the axially outer end of the outer ring 3, there extends a dust boot 21 that is constructed of a flexible material such as rubber, soft plastic or the like. As shown, for connecting the dust boot 21 to the outer ring 3 and to the stub shaft 18, respective metal rings 22 are used. For assuring flexibility, the dust boot 21 is folded back. Due to provision of the dust boot 21, the interior of the universal coupling 1 is protected from dusts.

It is thus to be noted that a unit including the stub shaft 18 and the inner ring 4 can pivot in universal directions about a center of the inner ring 4 with the aid of the balls 5.

As has been mentioned hereinabove, the hollow connecting member 2 is formed at its axially inside end with the annular flange 24 to which the ear portions 9a of the flange 9 of the outer ring 3 contact. As shown, the annular contact surface 25 of the annular flange 24 is formed with an annular recess 26 with which the annular ridge 11 of the outer ring 3 is intimately engaged.

The ear portions 9a of the flange of the outer ring 3 and the annular flange 24 of the connecting member 2 are secured by means of bolts 27 and nuts 28.

As shown, the connecting member 2 is formed at the diametrically enlarged end portion with an air passage 29 though which the interior of the hollow connecting member 2 is fluidly connected with the open air. As shown, the air passage 29 is of a bent passage that is positioned near the base portion of the annular flange 24. That is, the air passage 29 comprises an axially extending first part 29a that has an end exposed to the interior of the connecting member 2 and a radially extending second part 29b that has an end exposed to the open air. These two parts 29a and 29b are easily machined by a drilling process.

The hollow connecting member 2 is formed with a through bore 32 whose surrounding surface is formed with a plurality of parallel grooves, that is, splines. Coaxially engaged with the splined through bore 32 is a splined shaft 33 that is integrally provided by a stub shaft 34. The stub shaft 34 has a threaded head to which a nut 36 is engaged to suppress disengagement of the stub shaft 34 from the bore 32 of the connecting member 2. The stub shaft 34 is connected through a tube 35 to an output shaft of a transmission (not shown).

Around the stub shaft 34, there is arranged a center bearing device 39 which comprises a ball bearing 40 that is disposed about the stub shaft 34 and an annular insulator 41 that is disposed about the ball bearing 40. Although not shown in the drawing, the annular insulator 41 is connected though a holder to a vehicle body.

In operation, the power transmission shaft unit 100A transmits the torque of the output shaft of the transmission to the final drive gear.

During this operation, heat is inevitably generated particularly in the universal coupling 1 and thus air in the interior of the universal coupling 1 and that of the hollow connecting member 2 is forced to expand. The expanded air in the universal coupling 1 is discharged to the interior of the connecting member 2 through the air breather 13, and the expanded air in the interior of the connecting member 2 is discharged to the open air through the air passage 29. Thus, the interior of the universal coupling 1 and the connecting member 2 is suppressed from having a marked pressure, and thus, sealing members such as the dust boot 21 and the like are protected.

Due to the bent shape of the air passage 29, the passage 29 is prevented from entering of foreign matters, such as muddy water and the like. Since the air passage 29 has the radially extending second part 29b exposed to the open air, rotation of the power transmission shaft unit 100A facilitates discharging of such foreign things from the passage 29 due to generation of inertia force.

Figure 2:
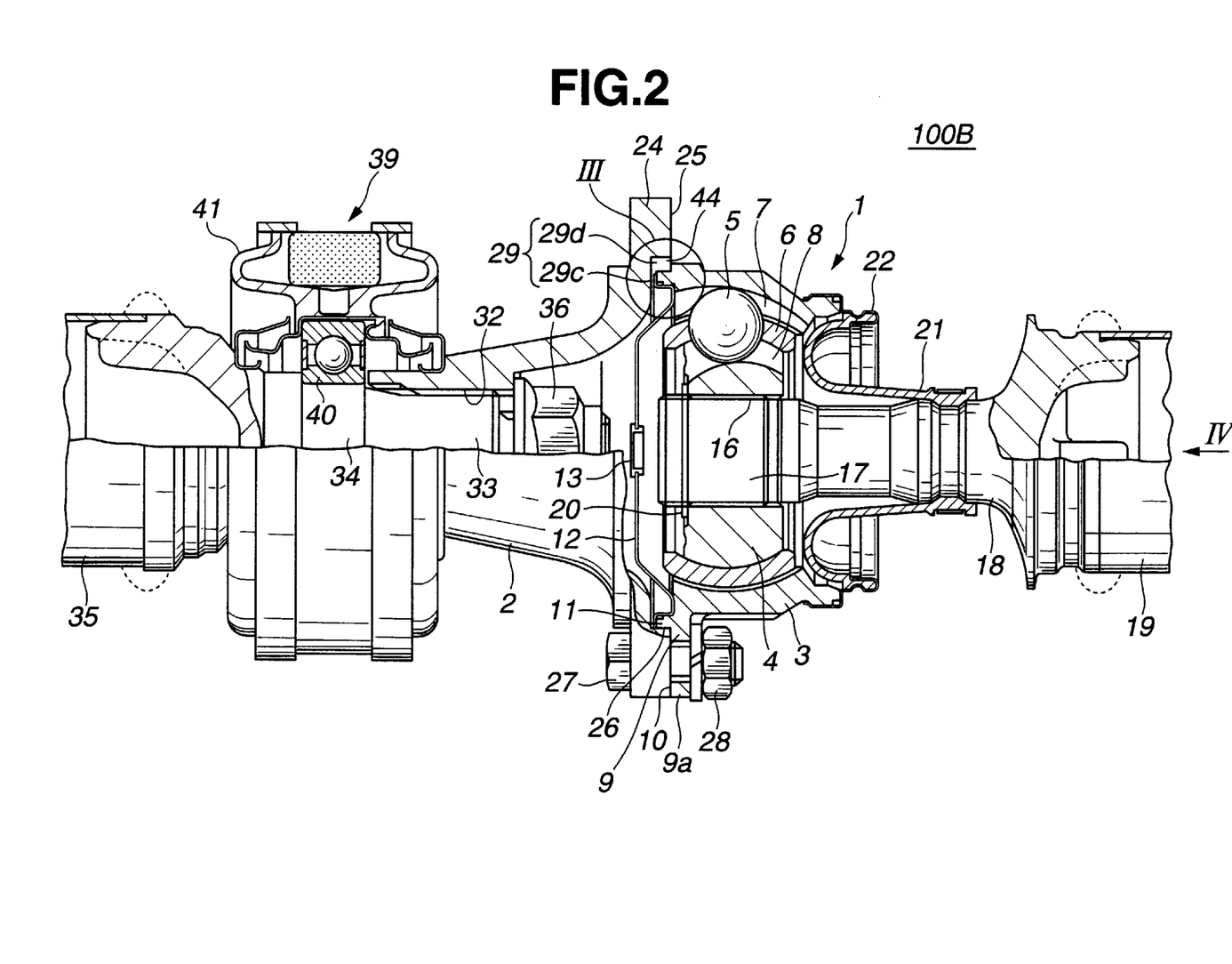
FIG. 2 is a view similar to FIG. 1, but showing a second embodiment of the present invention.

Referring to FIGS. 2 to 6, particularly FIG. 2, there is shown a power transmission shaft unit 100B which is a second embodiment of the present invention.

Since the power transmission shaft unit 100B of this second embodiment is similar to the above-mentioned shaft unit 100A of the first embodiment, only portions different from those of the first embodiment 100A will be described in the following.

Figure 3:
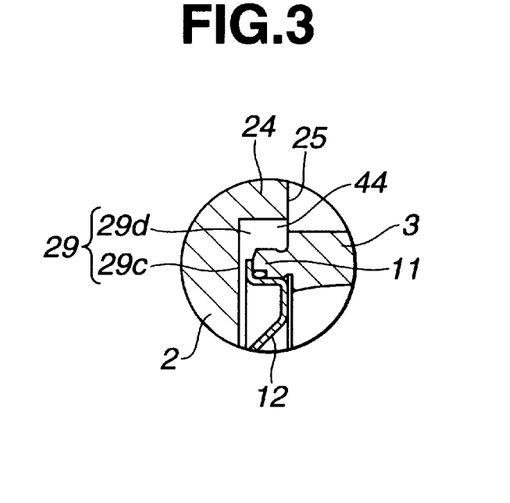
FIG. 3 is an enlarged sectional view of the portion indicated by reference "III" in FIG. 2.

As is best seen from FIGS. 2 and 3, the air passage 29 employed in the second embodiment 100A is provided by a clearance defined between the annular ridge 11 of the outer ring 3 and an outside wall of the annular recess 26 of the connecting member 2.

Figure 4:
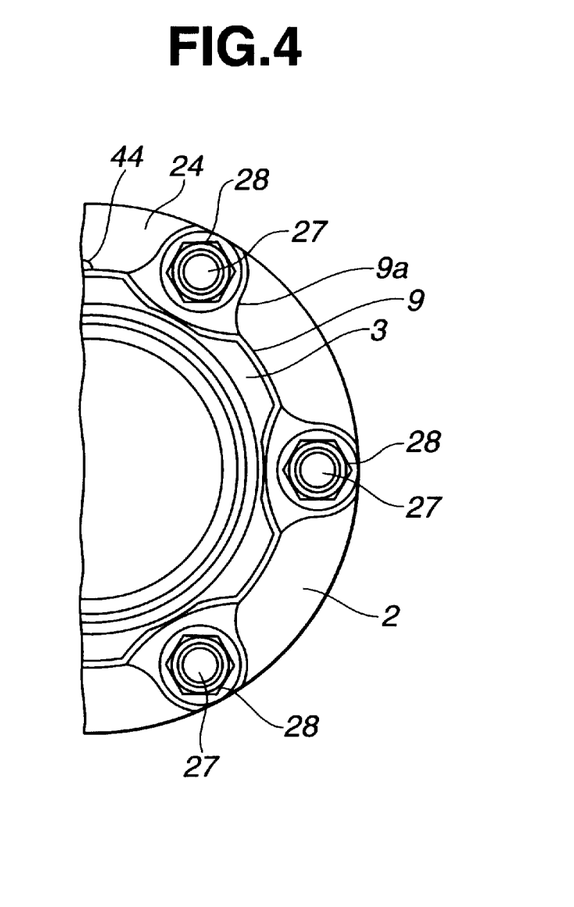
FIG. 4 is a half view taken from the direction of the arrow "IV" in FIG. 2.
Figure 5:
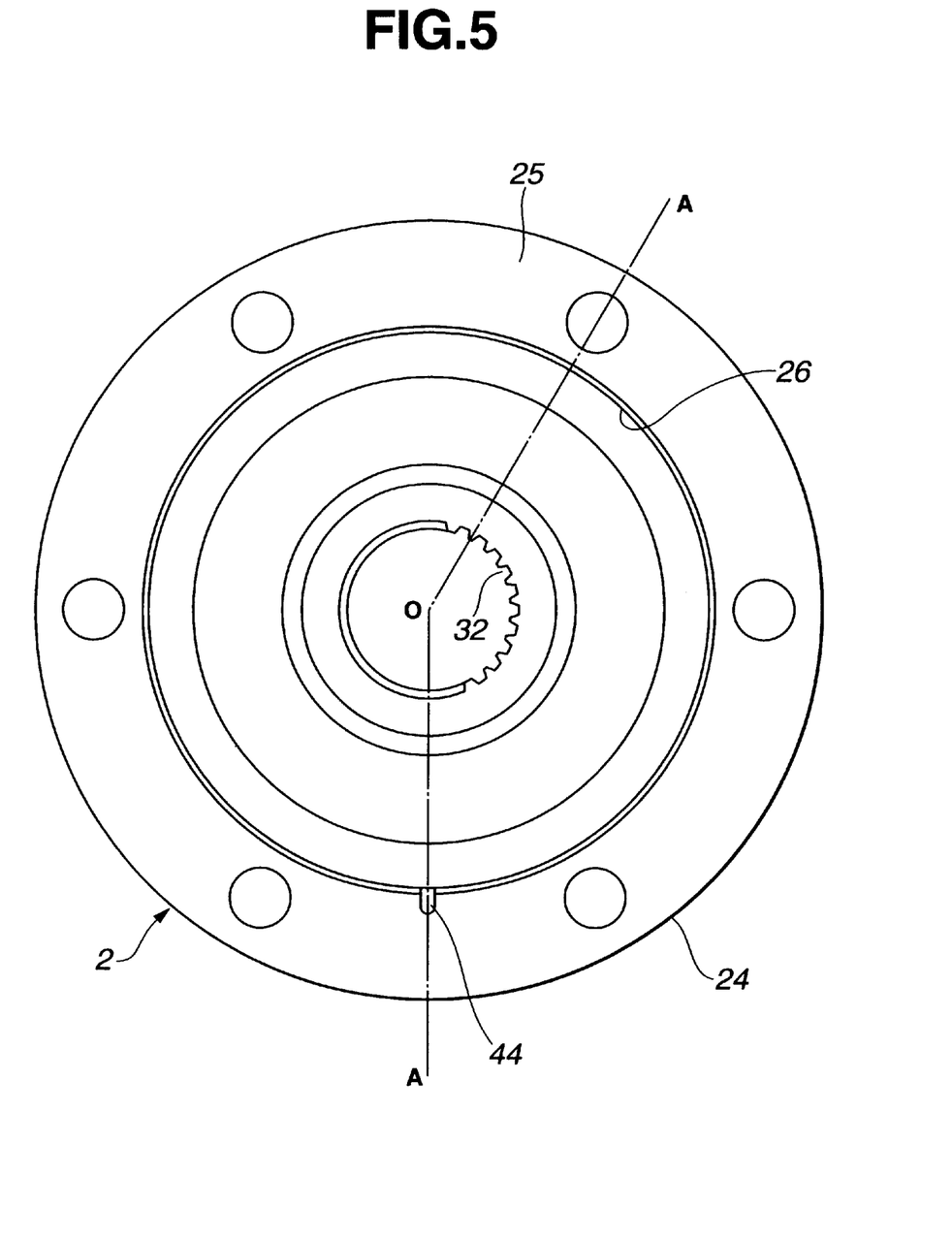
FIG. 5 is a plan view of a connecting member used in the power transmission shaft unit of the second embodiment.
Figure 6:
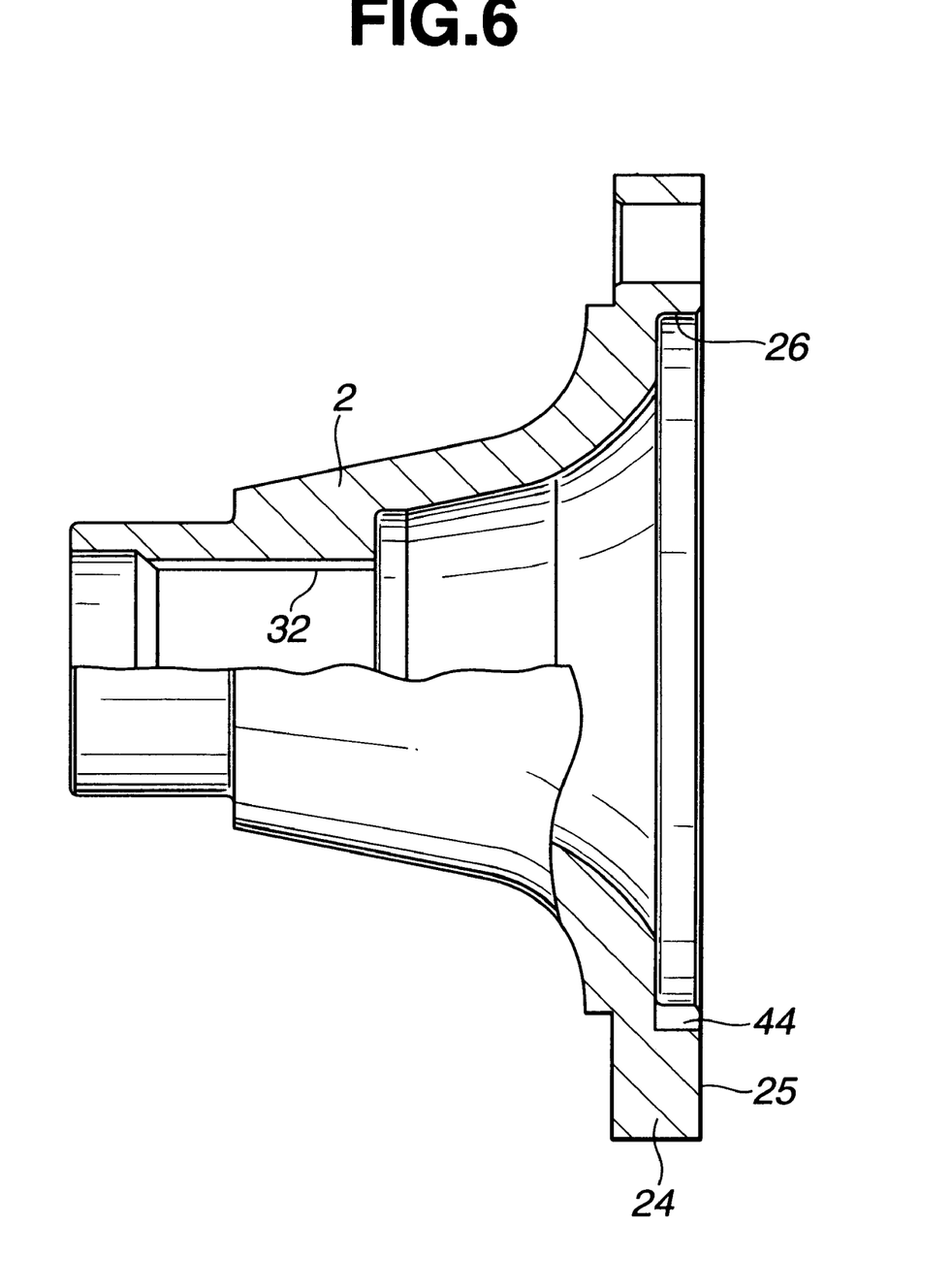
FIG. 6 is a sectional view taken along the line "A-O-A" of FIG. 5.

That is, as is seen from FIGS. 3, 4 and 5, the annular contact surface 25 of the annular flange 24 of the connecting member 2 is formed at its radially inside part with a small cut 44 that constitutes a second part 29d of the air passage 29. As is seen from FIG. 3, between a part of the annular ridge 11 of the outer ring 3 and a bottom of the annular recess 26 of the connecting member 2, there is defined a clearance that constitutes a first part 29c of the air passage 29. It is to be noted that the first part 29c extends in a radial direction and the second part 29d extends in an axial direction. Thus, the air passage 29 has a bent shape. Accordingly, the above-mentioned advantages possessed by the first embodiment 100A are also possessed by the second embodiment 100B.

Figure 7:
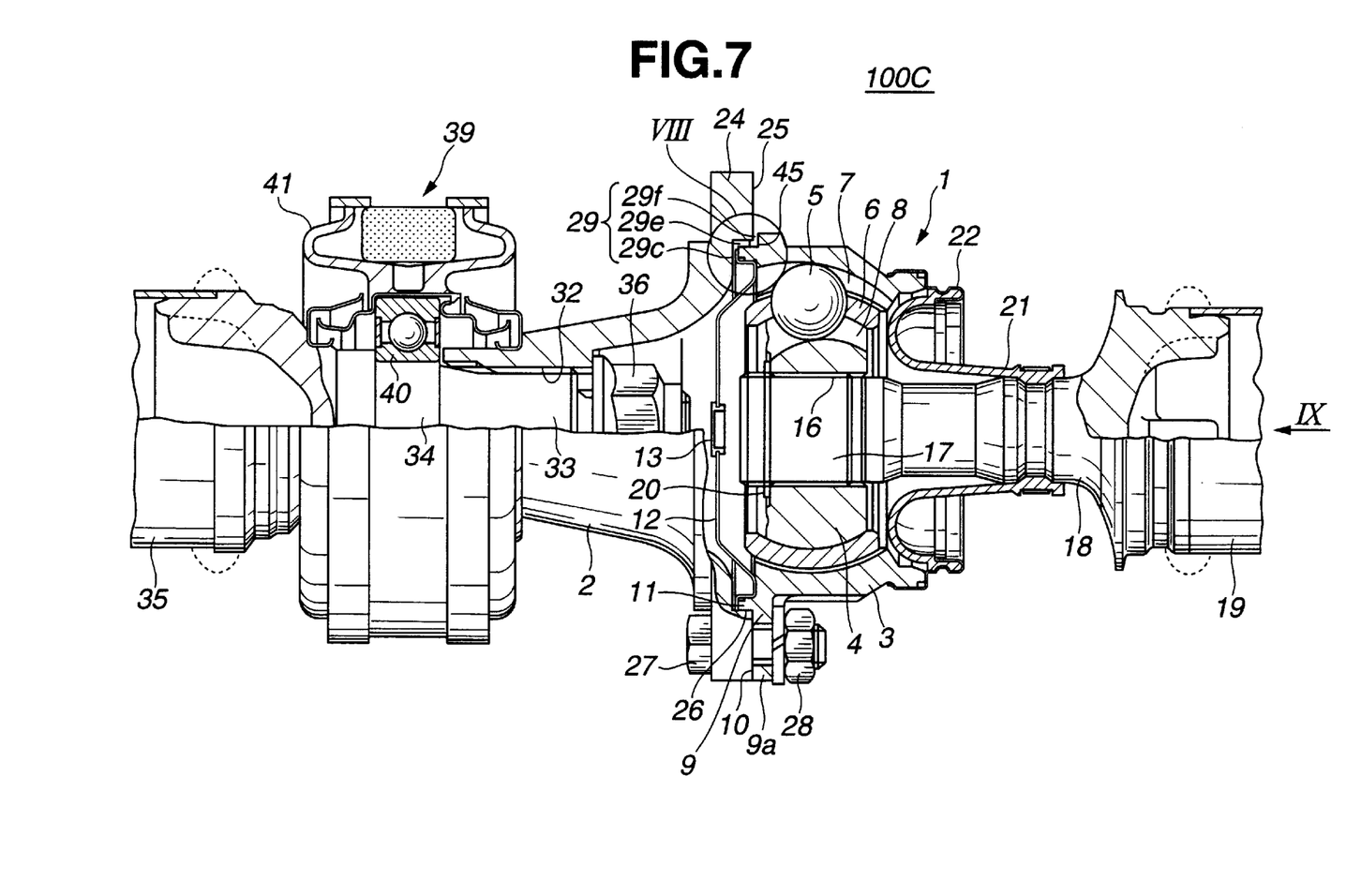
FIG. 7 is a view similar to FIG. 1, but showing a third embodiment of the present invention.

Referring to FIGS. 7 to 11, particularly FIG. 7, there is shown a power transmission shaft unit 100C which is a third embodiment of the present invention.

Similar to the above-mentioned second embodiment 100B, the air passage 29 employed in the third embodiment 100C is provided by a clearance defined between the annular ridge 11 of the outer ring 3 and the annular recess 26 of the connecting member 2.

Figure 8:
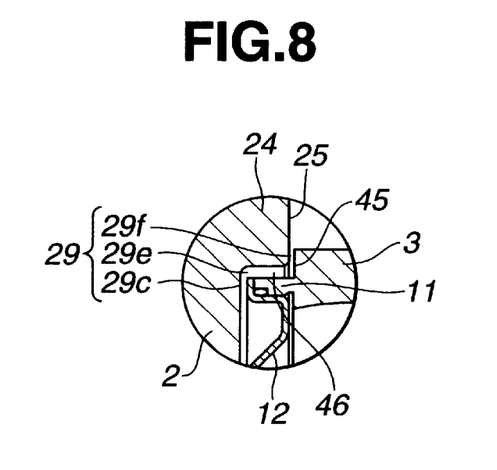
FIG. 8 is an enlarged sectional view of the portion indicated by reference "VIII" in FIG. 7.
Figure 9:
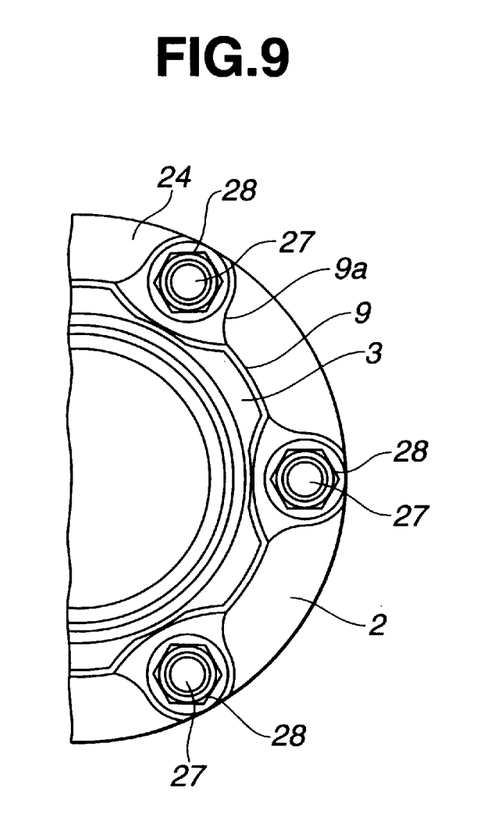
FIG. 9 is a half view taken from the direction of the arrow "IX" in FIG. 7.
Figure 10:
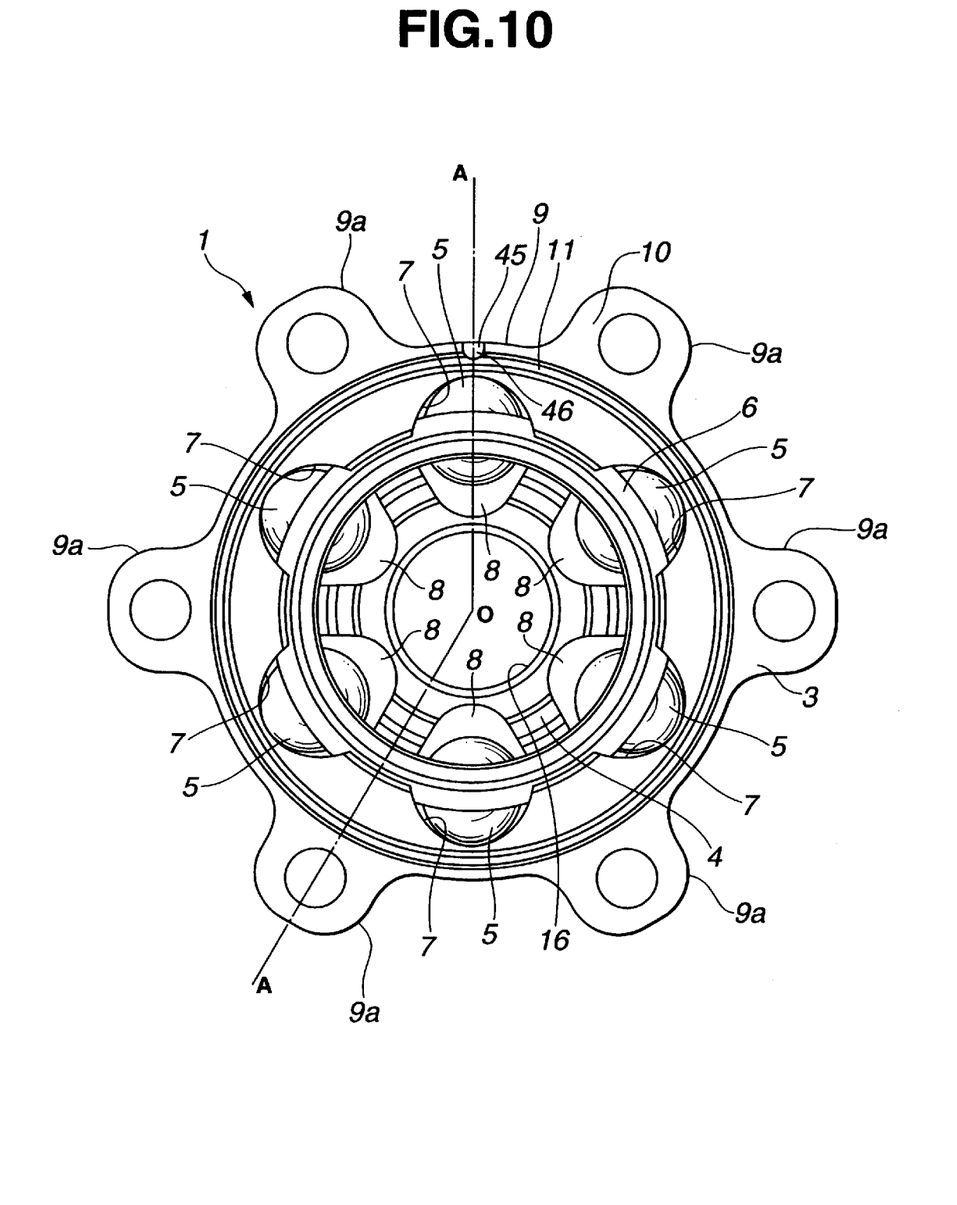
FIG. 10 is a plan view of a connecting member used in the power transmission shaft unit of the third embodiment.
Figure 11:
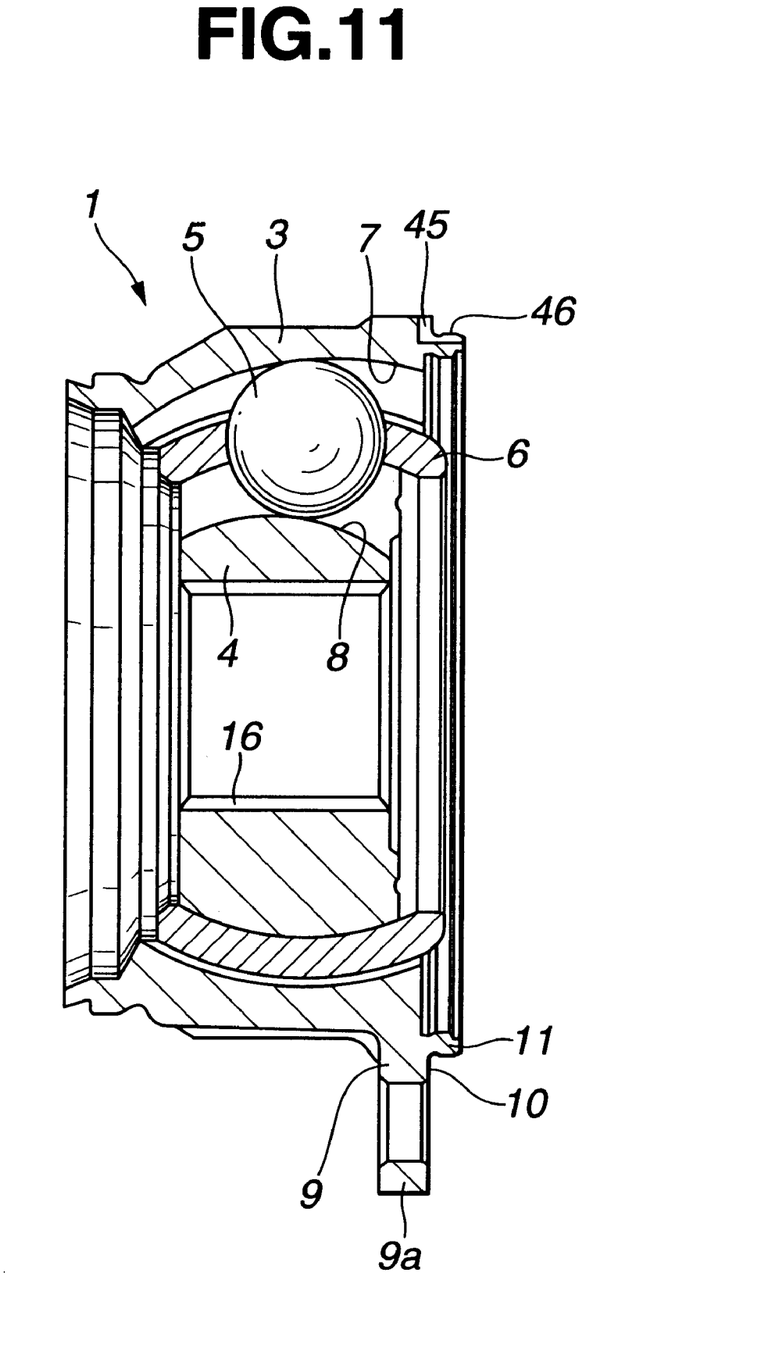
FIG. 11 is a sectional view taken along the line "A-O-A" of FIG. 10.

That is, as is seen from FIGS. 8, 10 and 11, the flat contact surface 10 of the flange 9 is formed with a cut 45, and the annular ridge 11 of the outer ring 3 is formed with a cut 46 that is communicated with the cut 45. Thus, as is seen from FIG. 8, the cut 45 constitutes a third part 29f of the air passage 29, the cut 46 constitutes a second part 29e of the air passage 29, and the clearance between the part of the annular ridge 11 and the bottom of the annular recess 26 constitutes a first part 29c of the air passage 29. It is to be noted that the first part 29c extends in a radial direction, the second part 29e extends in an axial direction and the third part 29f extends in a radial direction. Thus, the air passage 29 has a bent shape. Accordingly, the above-mentioned advantages are equally possessed by the third embodiment 100C.

The entire contents of Japanese Patent Application 11-246284 (filed Aug. 31, 1999) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:

1. A power transmission shaft unit comprising:

a universal coupling having a first contact surface;

a hollow connecting member having a second contact surface;

a coupling structure that connects said first and second contact surfaces in a manner to constitute an enclosed space that includes an interior of said universal coupling and that of said connecting member; and an air passage that extends between said enclosed space and an open air, said air passage being bent in shape, said air passage being defined between a part of said first contact surface and a part of said second contact surface, said first contact surface being formed with an annular ridge and said second contact surface being formed with an annular recess into and with which said annular ridge is intimately engaged.

2. A power transmission shaft unit as claimed in claim 1, in which said air passage is defined between said annular ridge and an outside wall of said annular recess.

3. A power transmission shaft unit as claimed in claim 2, further comprising a circular duct cap that is disposed in said enclosed space in a manner to divide the enclosed space into two portions, one being exposed to an interior of said universal coupling and the other being exposed to an interior of said connecting member.

4. A power transmission shaft unit as claimed in claim 3, in which said circular dust cap is provided with an air breather through which the two portions are selectively communicated.

5. A power transmission shaft unit as claimed in claim 4, in which the portion that is exposed to the interior of said connecting member is directly communicated with said air passage.

6. A power transmission shaft unit comprising:

a universal coupling having a first contact surface, said universal coupling including spherical outer and inner rings, a plurality of balls, a spherical cage for rotatably holding said balls between said outer and inner rings, a stub shaft having a splined end engaged with a splined bore formed in said inner ring and a dust boot extending between said dust boot and said stub shaft, said first contact surface being defined by an annular flange provided by said outer ring;

a hollow connecting member having at a diametrically enlarged end thereof a second contact surface;

a coupling structure that connects said first and second contact surfaces in a manner to constitute an enclosed space that includes an interior of said universal coupling and that of said hollow connecting member;

a dust cap disposed in said enclosed space to divide said enclosed space into first and second space portions, said first space portion being exposed to the interior of said universal coupling, said second space portion being exposed to the interior of said connecting member;

an air breather provided by said dust cap, said air breather permitting an air flow from said first space portion to said second space portion; and an air passage that extends between said second space portion of the enclosed space and an open air, said air passage being bent in shape.

7. A power transmission shaft unit as claimed in claim 6, in which said air passage is formed in said diametrically enlarged end of said connecting member in the vicinity of said coupling structure.

8. A power transmission shaft unit as claimed in claim 6, in which said air passage is a clearance defined between said first and second contact surfaces.

9. A power transmission shaft unit as claimed in claim 8, in which said first contact surface is formed with an annular ridge and in which said second contact surface is formed with an annular recess into and with which said annular ridge is intimately engaged.

10. A power transmission shaft unit as claimed in claim 9, in which said air passage is defined between said annular ridge and an outer wall of said annular recess.

* * * * *